(12) United States Patent
Hong

(10) Patent No.: US 12,056,356 B2
(45) Date of Patent: Aug. 6, 2024

(54) STORAGE DEVICE, ELECTRONIC DEVICE INCLUDING THE SAME, AND OPERATING METHOD THEREOF

(71) Applicant: SK hynix Inc., Gyeonggi-do (KR)

(72) Inventor: Seung Kyu Hong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/081,585

(22) Filed: Dec. 14, 2022

(65) Prior Publication Data

US 2024/0045590 A1 Feb. 8, 2024

(30) Foreign Application Priority Data

Aug. 4, 2022 (KR) .......................... 10-2022-0097030

(51) Int. Cl.
*G06F 3/06* (2006.01)
*G06F 12/02* (2006.01)

(52) U.S. Cl.
CPC .......... *G06F 3/0608* (2013.01); *G06F 3/0614* (2013.01); *G06F 3/0653* (2013.01); *G06F 3/0659* (2013.01); *G06F 3/0679* (2013.01); *G06F 12/0246* (2013.01); *G06F 2212/7207* (2013.01); *G06F 2212/7211* (2013.01)

(58) Field of Classification Search
None
See application file for complete search history.

(56) References Cited

U.S. PATENT DOCUMENTS

| | | | | |
|---|---|---|---|---|
| 2008/0288712 A1* | 11/2008 | Cornwell | ............ | G06F 11/0748 711/E12.008 |
| 2009/0327590 A1* | 12/2009 | Moshayedi | ......... | G06F 11/1441 711/E12.001 |
| 2016/0070474 A1* | 3/2016 | Yu | ........................ | G06F 12/0246 711/103 |
| 2016/0283368 A1* | 9/2016 | Hada | .................... | G06F 12/0246 |
| 2018/0286492 A1* | 10/2018 | Lee | ........................ | G11C 29/44 |
| 2021/0103394 A1* | 4/2021 | Rho | ...................... | G06F 3/0652 |
| 2022/0398040 A1* | 12/2022 | Kang | .................... | G06F 3/0679 |
| 2023/0335204 A1* | 10/2023 | Huo | ...................... | G11C 16/349 |

FOREIGN PATENT DOCUMENTS

| | | | |
|---|---|---|---|
| KR | 10-2020-0099882 A | 8/2020 | |
| KR | 10-2020-0133817 A | 11/2020 | |

* cited by examiner

*Primary Examiner* — Nathan Sadler
(74) *Attorney, Agent, or Firm* — IP & T GROUP LLP

(57) ABSTRACT

A storage device may include: a nonvolatile memory device including a plurality of memory blocks; and a memory controller for providing an external device with block count information including bitmap information representing whether an erase number of each of the plurality of memory blocks is equal to or greater than a reference value, performing an erase operation on a memory block in which data corresponding to a write command received from the external device is to be stored before the write command is executed, storing the data in the nonvolatile memory device, updating the block count information, and providing the updated block count information to the external device.

19 Claims, 14 Drawing Sheets

FIG. 4

HOST MEMORY BUFFER 101-3, 310

| 1 | 0 | 0 | 0 | 0 | 0 | 0 |
|---|---|---|---|---|---|---|
| 0 | 0 | 0 | 1 | 0 | 0 | 0 |
| 0 | 0 | 0 | 0 | 0 | 0 | 0 |
| 0 | 0 | 0 | 0 | 0 | 1 | 1 |
| 0 | 1 | 1 | 1 | 0 | 0 | 0 |
| 0 | 0 | 0 | 0 | 0 | 1 | 0 |
| 1 | 0 | 1 | 0 | 1 | 1 | 0 |

STORAGE DEVICE, ELECTRONIC DEVICE INCLUDING THE SAME, AND OPERATING METHOD THEREOF

CROSS-REFERENCE TO RELATED APPLICATION

The present application claims priority under 35 U.S.C. § 119(a) to Korean patent application number 10-2022-0097030, filed on Aug. 4, 2022, the entire disclosure of which is incorporated herein by reference.

BACKGROUND

1. Technical Field

Various embodiments of the present disclosure generally relate to an electronic device, and more particularly, to a storage device, an electronic device including the same, and an operating method thereof.

2. Related Art

Storage device may store data therein under the control of a host device such as a computer or a smart phone. A storage device may include a memory device for storing data and a memory controller for controlling the memory device. The memory device may be a volatile memory device or a nonvolatile memory device.

The volatile memory device may keep data stored therein only when power is supplied, and stored data disappears when the supply of power is interrupted. The volatile memory device may include a Static Random Access Memory (SRAM), a Dynamic Random Access Memory (DRAM), and the like.

The nonvolatile memory device may keep data stored therein even when the supply of power is blocked. The nonvolatile memory device may include a Read-Only Memory (ROM), a Programmable ROM (PROM), an Electrically Programmable ROM (EPROM), an Electrically Erasable Programmable ROM (EEPROM), a flash memory, and the like.

A Host Performance Booster (HPB) mode is one of techniques for improving the performance of storage devices. When a computing system including a storage device and a host operates in the HPB mode, both a host buffer included in the host and a buffer memory of the storage device may be used.

SUMMARY

Various embodiments of the present disclosure provide a storage device for efficiently utilizing a memory block by using bitmap information representing whether an erase number of the memory block is equal to or greater than a reference value, an electronic device including the storage device, and an operating method of the electronic device.

In accordance with an aspect of the present disclosure, there is provided a storage device including: a nonvolatile memory device including a plurality of memory blocks; and a memory controller configured to provide an external device with block count information including bitmap information representing whether an erase number of each of the plurality of memory blocks is equal to or greater than a reference value, perform an erase operation on a memory block in which data corresponding to a write command received from the external device is to be stored before the write command is executed, store the data in the nonvolatile memory device, update the block count information, and provide the updated block count information to the external device.

In accordance with another aspect of the present disclosure, there is provided a host device for controlling a storage device, the host device including: a host main memory configured to temporarily store therein data to be stored in the storage device; a host memory buffer configured to store therein block count information as bitmap information representing whether an erase number of each of a plurality of memory blocks included in the storage device is equal to or greater than a reference value; and a host processor configured to provide the storage device with a first write command instructing the storage device to store the data therein, receive, from the storage device, updated block count information including bitmap information representing whether the erase number of each of the plurality of memory blocks is equal to or greater than a reference value after the first write command is executed, and control the host main memory to maintain the data therein, based on a result obtained by comparing the block count information with the updated block count information.

In accordance with still another aspect of the present disclosure, there is provided a host device for controlling a storage device, the host device including: a host memory buffer configured to store block count information therein including bitmap information representing whether an erase number of each of a plurality of memory blocks included in the storage device is equal to or greater than a reference value; a host main memory configured to temporarily store data therein, the data being also stored in the storage device; and a host processor configured to provide the storage device with a read command for requesting the data stored in the storage device, and provide the storage device with a write command instructing the storage device to store therein the data stored in the host main memory, when the host processor receives, from the storage device, information representing that the read command has failed.

In accordance with still another aspect of the present disclosure, there is provided an operating method of a host device, the operating method including: keeping data in the host device when an erase count of a memory block storing the data in the memory system is greater than a threshold; and requesting the memory system to store the kept data in the memory system upon failure of reading the data from the memory block.

In accordance with still another aspect of the present disclosure, there is provided an operating method of a controller, the operating method including: detecting an erase count of a first memory block to provide a host device with information representing that the erase count is greater than a threshold; reporting, to the host device, failure of reading data from the first memory block, the data being also kept in the host device; and controlling, in response to a write request from the host device, the memory device to store the kept data in a second memory block.

BRIEF DESCRIPTION OF THE DRAWINGS

Embodiments of the present disclosure will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 4 is a diagram illustrating block count information stored in the host memory buffer in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and should not be construed as limited to the embodiments set forth herein.

Figure 1:
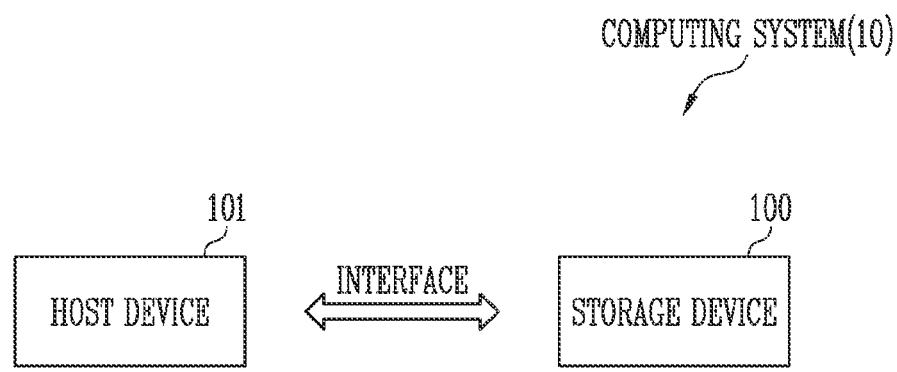
FIG. 1 is a diagram illustrating a computing system in accordance with an embodiment of the present disclosure.

FIG. 1 is a diagram illustrating a computing system 10 in accordance with an embodiment of the present disclosure.

Referring to FIG. 1, the computing system 10 may include a storage device 100 and a host device 101.

The host device 101 may communicate with the storage device 100, using at least one of various communication standards or interfaces, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

In this specification, for convenience of description, it is described that the storage device 100 and the host device 101 perform data communication according to a UFS communication interface. However, embodiments of the present disclosure are not limited to that the data communication is performed according to the USF communication interface. Specifically, the storage device 100 and the host device 101 may perform data communication by using a command defined as a Protocol Information Unit (hereinafter, referred to as PIU). The PIU may be a type of data packet generated according to a predetermined protocol.

The PIU may be a command with which the host device 101 or the storage device 100 requests, instructs or responds to performance of an operation. In an embodiment, various PIUs may be defined according to uses and purposes. For example, the PIU may be any of a query request PIU, a command PIU, a response PIU, a data out PIU, a data in PIU, and a ready to transfer PIU.

In an embodiment, the query request PIU may include a device descriptor for providing several parameters. The device descriptor may include information representing whether the storage device 100 is a storage device which supports an advance replay protection memory block (RPMB) mode.

The smallest size of the PIU may be 32 bytes, and the largest size of the PIU may be 65,600 bytes. The format of the PIU may have different sizes according to types thereof. A hardware configuration of the host device 101 will be described in FIG. 2.

The storage device 100 may be a device for storing data under the control of the host device 101, such as a mobile phone, a smart phone, an MP3 player, a laptop computer, a desktop computer, a game console, a TV, a tablet PC or an in-vehicle infotainment system. Also, the storage device 100 may be a device for storing data under the control of the host device 101 for storing high-capacity data in one place, such as a server or a data center.

The storage device 100 may be manufactured as any of various types of storage devices according to a host interface that is a communication scheme with the host device 101. For example, the storage device 100 may be configured with any of a variety of types of memory modules, such as a Solid State Drive (SSD), a multimedia card in the form of an MMC, an eMMC, an RS-MMC and a micro-MMC, a secure digital card in the form of an SD, a mini-SD and a micro-SD, a Universal Serial Bus (USB) memory module, a Universal Flash Storage (UFS) device, a personal computer memory card international association (PCMCIA) card type memory module, a peripheral component interconnection (PCI) card type memory module, a PCI express (PCI-E) card type memory module, a Compact Flash (CF) card, a Smart Media Card (SMC), and a memory stick.

The storage device 100 may be manufactured as any of various package types. For example, the storage device 100 may be manufactured as any various package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP). A hardware configuration of the storage device 100 will be described in FIG. 2.

Figure 2:
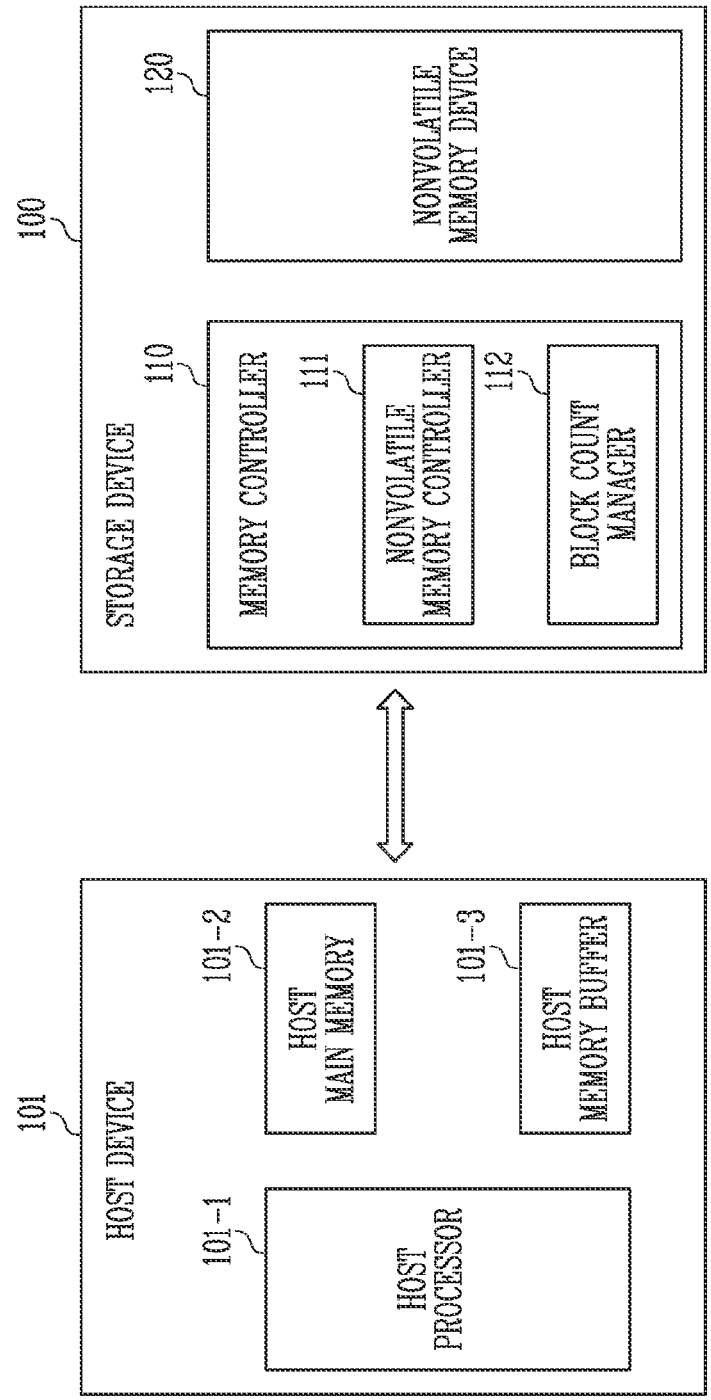
FIG. 2 is a diagram illustrating a storage device shown in FIG. 1 in accordance with an embodiment of the present disclosure.

FIG. 2 is a diagram illustrating the storage device 100 shown in FIG. 1 in accordance with an embodiment of the present disclosure.

Referring to FIG. 2, the host device 101 and the storage device 100 may include various hardware configurations.

The host device 101 may include a host processor 101-1, a host main memory 101-2, and a host memory buffer 101-3.

The host processor 101-1 may control overall operations of the host device 101. In an example, the host processor 101-1 may control the host main memory 101-2 or the host memory buffer 101-3, so that data is stored in the host main memory 101-2 or the host memory buffer 101-3.

The host main memory 101-2 may store data associated with the storage device 100. In an example, the host main memory 101-2 may temporarily store data to be stored in the storage device 100.

The host memory buffer 101-3 may store block count information as bitmap information representing whether an erase number of each of a plurality of memory blocks included in a nonvolatile memory device 120 of the storage device 100 is equal to or greater than a reference value. An example of the block count information is illustrated in FIG. 4.

In an embodiment, the host memory buffer 101-3 along with the host main memory 101-2 may be integrated into one circuit. That is, the host memory buffer 101-3 may be allocated to a partial memory area of the host main memory 101-2.

The storage device 100 may include a memory controller 110 and the nonvolatile memory device 120. The memory controller 110 may include a nonvolatile memory controller 111 and a block count manager 112. In an example, the nonvolatile memory controller 111 and the block count manager 112 may correspond to a control logic which performs different functions within one chip.

The memory controller 110 may control overall operations of the storage device 100.

When power is applied to the storage device 100, the memory controller 110 may execute firmware (FW). When the nonvolatile memory device 120 is a flash memory device, the memory controller 110 may execute FW such as a Flash Translation Layer (FTL) for controlling communication between the host device 101 and the nonvolatile memory device 120.

In an embodiment, the memory controller 110 may receive data and a Logical Block Address (LBA) from the host device 101, and translate the LBA into a Physical Block Address (PBA) representing addresses of memory cells included in the nonvolatile memory device 120, in which data is to be stored.

The nonvolatile memory controller 111 may control the nonvolatile memory device 120 to perform a program operation, a read operation, an erase operation, or the like in response to a request from the host device 101. In the program operation, the nonvolatile memory controller 111 may provide a program command, a PBA, and data to the nonvolatile memory device 120. In the read operation, the nonvolatile memory controller 111 may provide a read command and a PBA to the nonvolatile memory device 120. In the erase operation, the nonvolatile memory controller 111 may provide an erase command and a PBA to the nonvolatile memory device 120.

In an embodiment, the nonvolatile memory controller 111 may autonomously generate a command, an address, and data regardless of any request from the host device 101, and transmit the command, the address, and the data to the nonvolatile memory device 120. For example, the nonvolatile memory controller 111 may provide the nonvolatile memory device 120 with a command, an address, and data, which are used to perform read and program operations accompanied in performing wear leveling, read reclaim, garbage collection, or the like.

In an embodiment, the nonvolatile memory controller 111 may control at least two nonvolatile memory devices 120. The nonvolatile memory controller 111 may control the nonvolatile memory devices 120 according to an interleaving scheme to improve operational performance. The interleaving scheme may be a scheme for controlling operations on at least two nonvolatile memory devices 120 which overlap with each other.

The block count manager 112 may count an erase number (or PE count) of each of the plurality of memory blocks included in the nonvolatile memory device 120. In an example, the block count manager 112 may count that an erase number of a first memory block included in the nonvolatile memory device 120 is 75 k and an erase number of a second memory block included in the nonvolatile memory device 120 is 85 k.

The block count manager 112 may generate bitmap information on whether the erase number of each of the plurality of memory blocks included in the nonvolatile memory device 120 exceeds the reference value. In an example, the block count manager 112 may generate bitmap information bitmap information having a value of "0," which represents that the erase number of the first memory block included in the nonvolatile memory device 120 is 75 k which does not exceed 80 k as the reference value. In another example, the block count manager 112 may generate bitmap information having a value of "1," which represents that the erase number of the second memory block included in the nonvolatile memory device 120 is 85 k which exceeds 80 k as the reference value.

The nonvolatile memory device 120 may include a memory cell array (not shown) including a plurality of memory cells for storing data.

Each of the memory cells may be configured as any of a Single Level Cell (SLC) capable of storing one data bit, a Multi-Level Cell (MLC) capable of storing two data bits, a Triple Level Cell (TLC) capable of storing three data bits, and a Quadruple Level Cell (QLC) capable of storing four data bits.

The memory cell array (not shown) may include a plurality of memory blocks. Each memory block may include a plurality of memory cells. Each memory block may include a plurality of pages. In an embodiment, the page may be a unit for storing data in the nonvolatile memory device 120 or for reading data stored in the nonvolatile memory device 120. The memory block may be a unit for erasing data.

In an embodiment, the nonvolatile memory device 120 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the nonvolatile memory device 120 is a NAND flash memory is described.

The nonvolatile memory device 120 may receive a command and an address from the memory controller 110, and access an area selected by the address in the memory cell array. The nonvolatile memory device 120 may perform an operation indicated by the command on the area selected by the address. For example, the nonvolatile memory device 120 may perform a write operation (program operation), a read operation, and an erase operation. In the program operation, the nonvolatile memory device 120 may program data in the area selected by the address. In the read operation, the nonvolatile memory device 120 may read data from the area selected by the address. In the erase operation, the nonvolatile memory device 120 may erase data stored in the area selected by the address.

Figure 3:
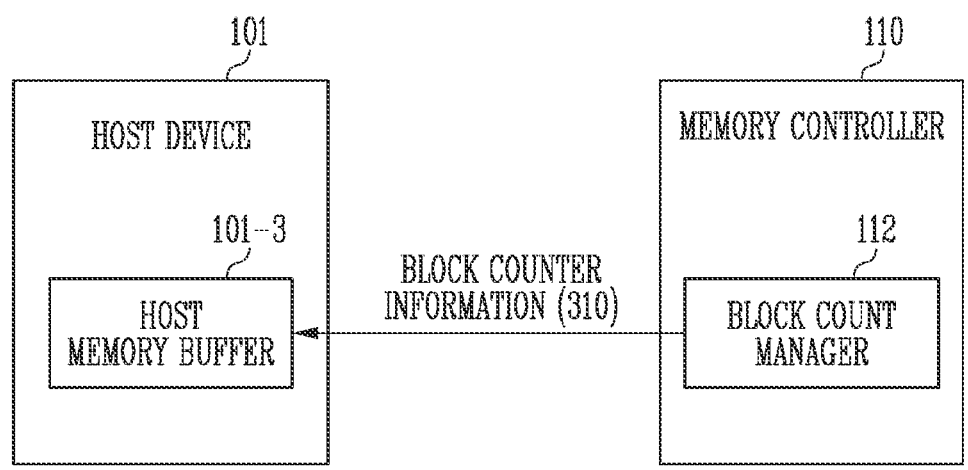
FIG. 3 is a diagram illustrating an operation of providing, by a block count manager, block count information to a host memory buffer in accordance with an embodiment of the present disclosure.

FIG. 3 is a diagram illustrating an operation of providing, by the block count manager 112, block count information 310 to the host memory buffer 101-3 in accordance with an embodiment of the present disclosure.

Referring to FIG. 3, the block count manager 112 included in the memory controller 110 may provide the host device 101 with block count information 310 to be stored in the host memory buffer 101-3 included in the host device 101. The memory controller 110 may be the same component as the memory controller 110 shown in FIG. 2.

The block count manager 112 included in the memory controller 110 may provide the block count information 310 to the host device 101. In an example, the block count information 310 which the memory controller 110 provides the host device 101 may include bitmap information representing whether an erase number of each of the plurality of memory blocks of the nonvolatile memory device 120 shown with reference to FIG. 2 is equal to or greater than a reference value.

In an embodiment, the block count manager 112 may provide, periodically or at a random time, the block count information 310 to the host device 101. For example, the block count manager 112 may provide the block count information 310 to the host device 101 whenever an operation according to a request of the host device 101 is completely performed. Alternatively, the block count manager 112 may allow the block count information 310 to be included in a response message representing a result obtained by performing the operation according to the request of the host device 101, and provide the response message to the host device 101.

FIG. 4 is a diagram illustrating block count information 310 stored in the host memory buffer 101-3 in accordance with an embodiment of the present disclosure.

Referring to FIG. 4, the block count information 310 stored in the host memory buffer 101-3 shown with reference to FIG. 2 may be information which has a value of 1 with respect to a memory block having an erase number which is equal to or greater than a reference value among the plurality of memory blocks of the nonvolatile memory device 120 shown with reference to FIG. 2 and may be information which has a value of 0 with respect to a memory block having an erase number which is less than the reference value among the plurality of memory blocks of the nonvolatile memory device 120 shown with reference to FIG. 2.

In an embodiment, the block count information 310 may have a data structure in a bitmap form. One bit included in the block count information 310 may correspond to one memory block. For example, FIG. 4 illustrates the block count information 310 including a value of "0" or "1" in a matrix of 7 by 7. Therefore, the block count information 310 shown in FIG. 4 may be information representing whether an erase number of each of 49 memory blocks is equal to or greater than the reference value.

Figure 5:
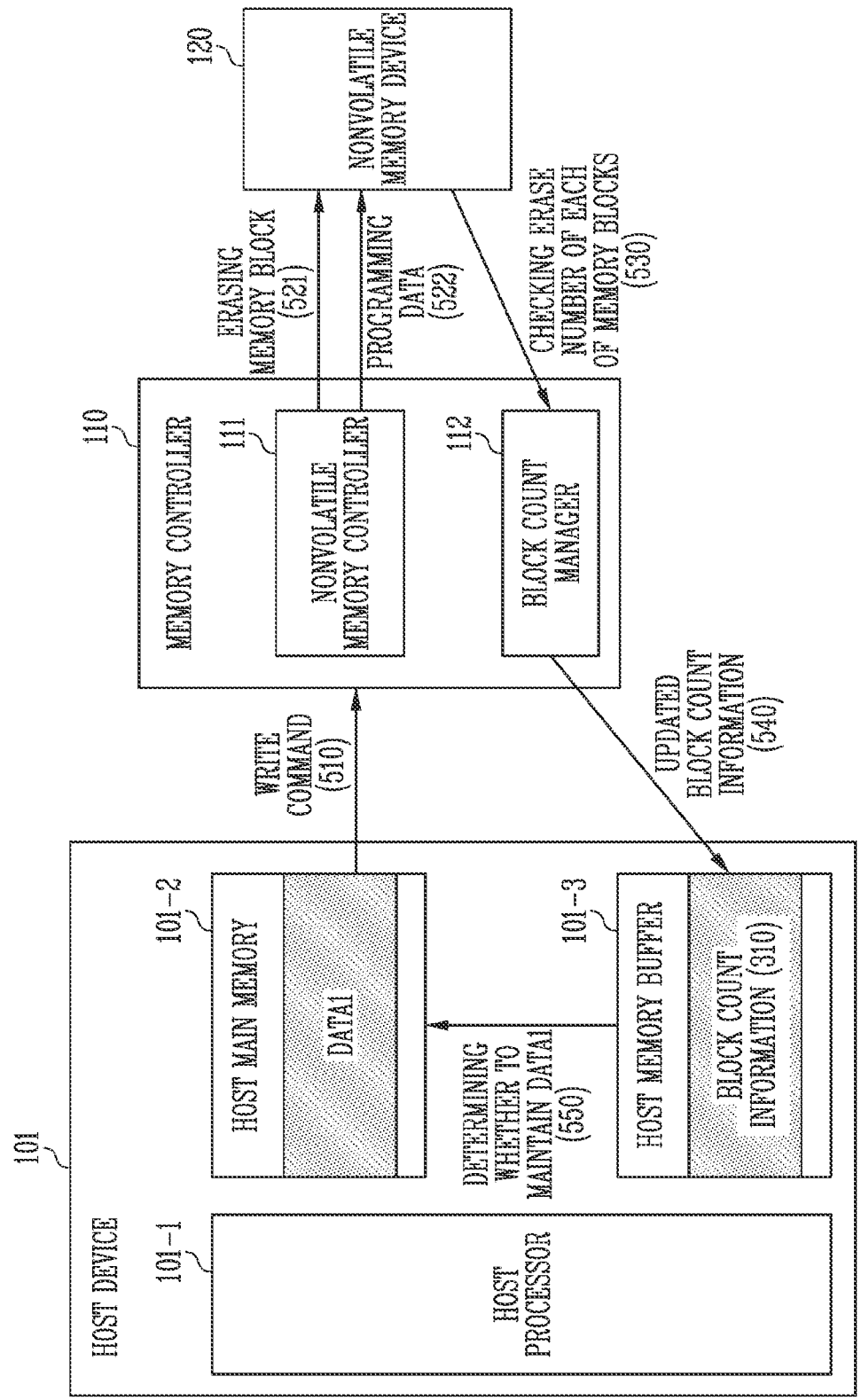
FIG. 5 is a diagram illustrating an operation of determining, by a host device, whether to maintain data stored in a host main memory by comparing block count information stored in the host memory buffer with updated block count information in accordance with an embodiment of the present disclosure.

FIG. 5 is a diagram illustrating an operation of determining (550), by the host device 101, whether to maintain data stored in the host main memory 101-2 by comparing block count information 310 stored in the host memory buffer 101-3 with updated block count information 540 in accordance with an embodiment of the present disclosure.

Referring to FIG. 5, after the host device 101 provides a write command 510 to the memory controller 110, the host device 101 may receive updated block count information 540 from the memory controller 110, and perform an operation of determining (550) whether to maintain data (e.g., DATA1) stored in the host main memory 101-2 by comparing block count information 310 stored in the host memory buffer 101-3 with the updated block count information 540.

The host processor 101-1 may provide the nonvolatile memory controller 111 with the write command 510 instructing the data (e.g., DATA1) stored in the host main memory 101-2 to be stored in the nonvolatile memory device 120. In an example, the write command 510 which the host processor 101-1 provides to the memory controller 110 may be provided together with DATA1 stored in the host main memory 101-2 and a logical address of the DATA1 to the nonvolatile memory controller 111.

After the nonvolatile memory controller 111 receives the write command 510 instructing the data (e.g., DATA1) stored in the host main memory 101-2 to be stored in the nonvolatile memory device 120, the nonvolatile memory controller 111 may perform an operation of erasing (521) a memory block of the nonvolatile memory device 120, in which data (e.g., DATA1) corresponding to the write command 510 is to be stored, before the corresponding data (e.g., DATA1) is programmed in the nonvolatile memory device 120 in response to the write command 510. In an example, after the nonvolatile memory controller 111 receives the write command 510 instructing the data (e.g., DATA1) stored in the host main memory 101-2 to be stored in the nonvolatile memory device 120, the nonvolatile memory controller 111 may perform an operation of erasing (521) a first memory block of the nonvolatile memory device 120, in which the DATA1 is to be stored, before the DATA1 is programmed in response to the write command 510.

After the nonvolatile memory controller 111 performs the operation of erasing (521) the memory block of the nonvolatile memory device 120, in which the data (e.g., DATA1) corresponding to the write command 510 is to be stored, the nonvolatile memory controller 111 may program (522) the corresponding data (e.g., DATA1) in the memory block of the nonvolatile memory device 120, in which the data (e.g., DATA1) corresponding to the write command 510 is to be stored. In an example, after the nonvolatile memory controller 111 performs the operation of erasing (521) the first memory block of the nonvolatile memory device 120, in which the DATA1 corresponding to the write command 510 is to be stored, the nonvolatile memory controller 111 may program (522) the DATA1 corresponding to the write command 510 in the first memory block in which the DATA1 is to be stored.

After the nonvolatile memory controller 111 performs the operation of erasing 521 the memory block of the nonvolatile memory device 120, in which the data corresponding to the write command 510 is to be stored, the block count manager 112 may check (530) an erase number of each of the plurality of memory blocks of the nonvolatile memory device 120. When the nonvolatile memory controller 111 performs the operation of erasing (521) the memory block of the nonvolatile memory device 120, in which the data corresponding to the write command 510 is to be stored, the block count manager 112 may count a change erase number of the memory block of the nonvolatile memory device 120, on which an erase (521) operation is performed. In an example, after the nonvolatile memory controller 111 performs a program 522 operation on the memory block of the nonvolatile memory device 120, in which the data corresponding to the write command 510 is to be stored, the block count manager 112 may check (530) an erase number of each of the memory blocks of the nonvolatile memory device 120. In another example, after the nonvolatile memory controller 111 performs an erase 521 operation on the memory block of the nonvolatile memory device 120, in which the data corresponding to the write command 510 is to be stored, the block count manager 112 may check (530) an erase number of each of the memory blocks of the nonvolatile memory device 120.

After the block count manager 112 checks (530) the erase number of each of the plurality of memory blocks of the nonvolatile memory device 120, the nonvolatile memory controller 111 may provide the host device 101 with the block count information 540 updated as the erase (521) operation is performed. In an example, the nonvolatile memory controller 111 may provide the host device 101 with the response message as a result obtained by executing the write command 510 received from the host processor 101-1 and the updated block count information 540. In another example, after the nonvolatile memory device 111 provides the host device 101 as the response message, the result obtained by executing the write command 510 received from the host processor 101-1, the nonvolatile memory device 111 may provide the updated block count information 540 to the host device 101.

The host processor 101-1 may determine (550) whether to maintain the data (e.g., DATA1) stored in the host main memory 101-2, based on a result obtained by comparing the block count information 310 stored in the host memory buffer 101-3 with the updated block count information 540 received from the block count manager 112. In an example, when the host processor 101-1 provides the nonvolatile memory controller 111 with the write command 510 instructing the DATA1 stored in the host main memory 101-2 to be stored in the nonvolatile memory device 120, the nonvolatile memory controller 111 programs the DATA1 in the first memory block of the nonvolatile memory device 120, in which the data corresponding to the write command 510 is to be stored, and the block count manager 112 provides the updated block count information 540 to the host device 101, the host processor 101-1 may control the host main memory 101-2 to maintain the DATA1 stored in the host main memory 101-2, when the erase number of the first memory block is changed from less than a specified value to no less than the specified value as the result obtained by comparing the block count information 310 stored in the host memory buffer 101-3 with the updated block count information 540 received from the block count manager 112. For example, when information on the first memory block is changed by comparing the block count information 310 stored in the host memory buffer 101-3 with the updated block count information 540 received from the block count manager 112, the host processor 101-1 may control the host main memory 101-2 to maintain data corresponding to the first memory block, which is stored in the host main memory 101-2.

Figure 6:
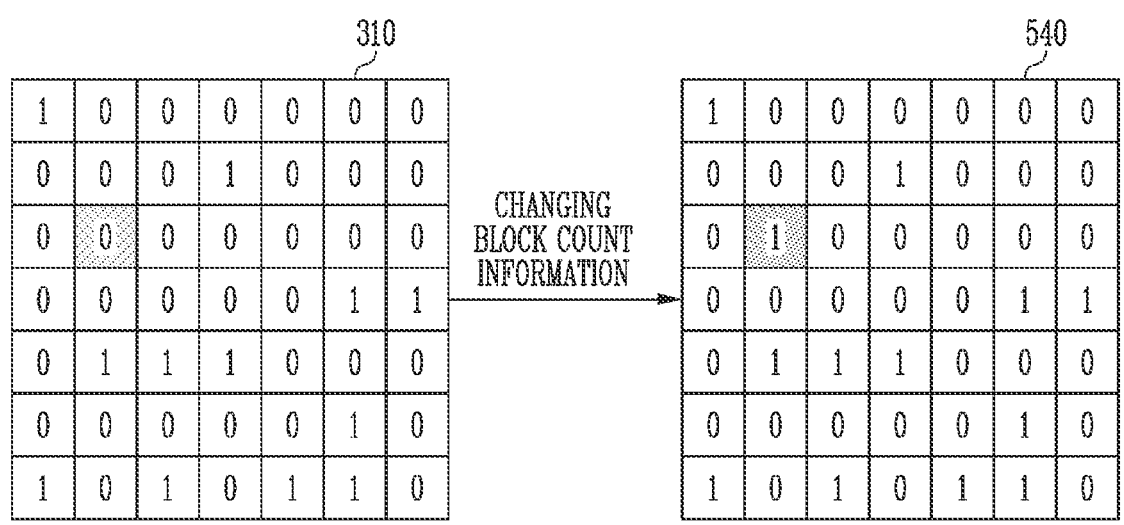
FIG. 6 is a diagram illustrating an example in which block count information is changed to updated block count information in accordance with an embodiment of the present disclosure.

FIG. 6 is a diagram illustrating an example in which block count information 310 is changed to updated block count information 540 in accordance with an embodiment of the present disclosure. FIG. 6 is described with reference to the hardware configuration shown in FIG. 2.

Referring to FIG. 6, when comparing the block count information 310 stored in the host memory buffer 101-3 with the updated block count information received from the block count manager 112, partial information of the block count information 310 may be changed.

In an embodiment, the block count information 310 and the updated block count information 540 may include bit-map information having a matrix of 7 by 7. In an example, the block count information 310 having a value of "0" at a matrix position of 3 by 2 may be changed to the updated block count information 540 having a value of "1" at the matrix position of 3 by 2. Information included in matrix positions except the matrix position of 3 by 2 in the block count information 310 may not be changed.

When information corresponding to a first matrix position of the block count information 310 is changed as the result obtained by comparing the block count information 310 with the updated block count information 540, the host processor 101-1 may determine that an erase number of a first memory block of the nonvolatile memory device 120, which corresponds to the first matrix position, has been changed from less than the reference value to no less than the reference value. In an example, when the information corresponding to the first matrix position of the block count information 310 is changed as the result obtained by comparing the block count information 310 with the updated block count information 540, the host processor 101-1 may control the host main memory 101-2 to maintain the same data as data (e.g., DATA1) stored in the first memory block corresponding to the first matrix position among the data stored in the host main memory 101-2.

Figure 7:
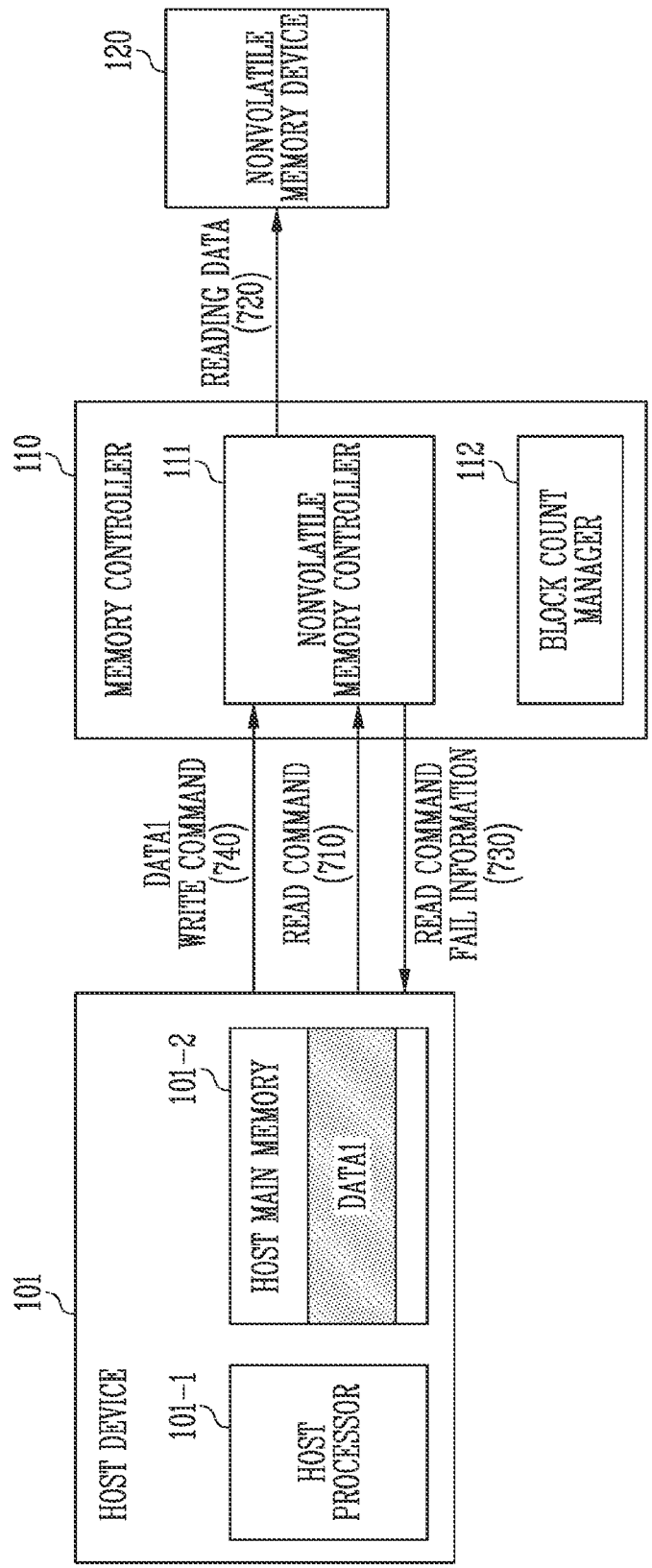
FIG. 7 is a diagram illustrating an operation of transmitting, by the host device, a write command for data stored in the host main memory when the host device receives read command fail information in accordance with an embodiment of the present disclosure.

FIG. 7 is a diagram illustrating an operation of transmitting, by the host device 101, a write command 740 for data (e.g., DATA1) stored in the host main memory 101-2 when the host device 101 receives read command fail information 730 in accordance with an embodiment of the present disclosure.

Referring to FIG. 7, when the host device 101 receives read command fail information 730 representing that a read command provided to the storage device 100 has failed, the host device 101 may provide the storage device 100 with a write command 740 for DATA1 stored in the host main memory 101-2. In an example, the DATA1 may be data to be read as the host processor 101-1 provides a read command 710 to the storage device 100.

The host processor 101-1 may provide the nonvolatile memory device 111 with the read command 710 instructing data to be read. In an example, the host processor 101-1 may provide the nonvolatile memory controller 111 with a logical address corresponding to the data to be read among the data stored in the nonvolatile memory device 120 and the read command 710 instructing the corresponding logical address to be read.

The nonvolatile memory controller 111 receiving the read command 710 from the host processor 101-1 may perform an operation of reading (720) data stored in a memory block of the nonvolatile memory device 120, which has a physical address corresponding to the logical address of the data to be read, according to the read command 710. In an example, the nonvolatile memory controller 111 may perform an operation of reading (720) DATA1 to be read, which is stored in a first memory block having a first physical address corresponding to a first logical address of the DATA1, according to the read command 710.

When the nonvolatile memory controller 111 does not perform a read (720) operation corresponding to the read command 710 received from the host processor 101-1, the nonvolatile memory controller 111 may provide the read command fail information 730 to the host device 101. In an example, when an erase number of the first memory block having the first physical address corresponding to the first logical address of the DATA1 as the data to be read according to the read command 710 received from the host processor 101-1 is less than a first reference value or a second reference value, the nonvolatile memory controller 111 may not provide the read command fail information 730 to the host device 101. When the erase number of the first memory block having the first physical address corresponding to the first logical address of the DATA1 as the data to be read according to the read command 710 received from the host process 101-1 is less than the first reference value, the block count manager 112 may not update block count information including bitmap information representing whether an erase number of the plurality of memory blocks included in the nonvolatile memory device 120 is equal to or greater than the first reference value. When the erase number of the first memory block having the first physical address corresponding to the first logical address of the DATA1 as the data to be read according to the read command 710 received from the host processor 101-1 is equal to or greater than the first reference value and is equal to or less than the second reference value, the block count manager 112 may update the block count information including bitmap information representing whether an erase number of the plurality of memory blocks included in the nonvolatile memory device 120 is equal to or greater than the first reference value. In another example, when the erase number of the first memory block having the first physical address corresponding to the first logical address of the DATA1 as the data to be read according to the read command 710 received from the host processor 101-1 is equal to or greater than the second reference value, the nonvolatile memory controller 111 may provide the read command fail information 730 to the host device 101. For example, when the erase number of the first memory block having the first physical address corresponding to the first logical address of the DATA1 as the data to be read according to the read command 710 received from the host processor 101-1 is 79.999 k which is less than 80 k as the first reference value, the block count manager 112 may not update the block count information. In another example, when the erase number of the first memory block having the first physical address corresponding to the first logical address of the DATA1 as the data to be read according to the read command 710 received from the host processor 101-1 is 80 k as the first reference value, the block count manager 112 may update the block count information. In still another example, when the erase number of the first memory block having the first physical address corresponding to the first logical address of the DATA1 as the data to be read according to the read command 710 received from the host processor 101-1 is 100 k as the second reference value, the nonvolatile memory controller 111 may provide the read command fail information 730 to the host device 101.

In response to that the host processor 101-1 receives, from the nonvolatile memory controller 111, the read command fail information 730 representing that a read operation corresponding to the read command 710 has failed, the host processor 101-1 may provide the nonvolatile memory controller 111 with a DATA1 write command 740 instructing DATA1 which corresponds to the read command 710 and is stored in the host main memory 101-2 to be written in the nonvolatile memory device 120. In an example, the host processor 101-1 may provide the nonvolatile memory device 111 with the DATA1 write command 740, the DATA1, and the logical address of the DATA1.

The nonvolatile memory controller 111 receiving the DATA1 write command 740 from the host processor 101-1 may program the DATA1 in a memory block having a physical address corresponding to the logical address of the DATA1 among the plurality of memory blocks of the nonvolatile memory device 120.

Figure 8:
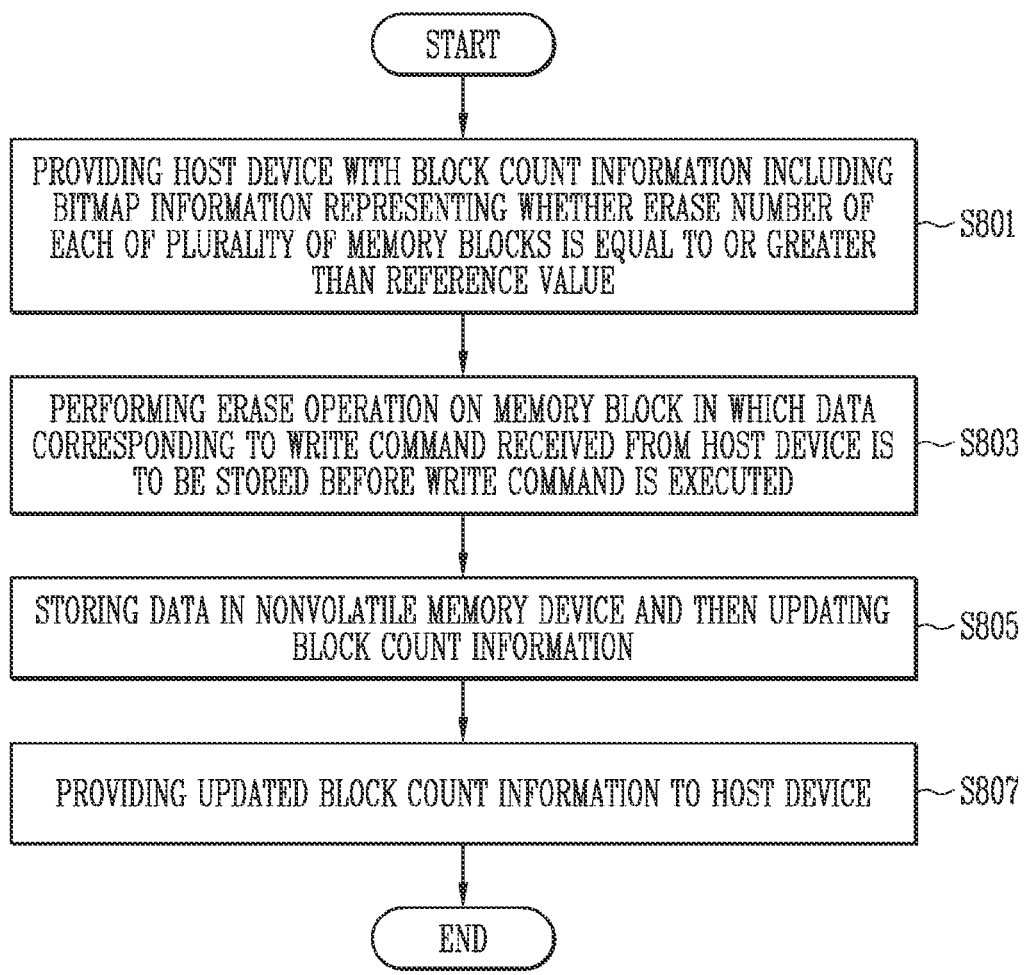
FIG. 8 is a flowchart for describing an operation of the storage device in accordance with an embodiment of the present disclosure.

FIG. 8 is a flowchart for describing an operation of the storage device 100 in accordance with an embodiment of the present disclosure.

Referring to FIG. 8, the storage device 100 may perform an erase operation on a memory block in which data corresponding to a write command received from the host device 101 is to be stored before the storage device 100 receives the write command, and then provide updated block count information to the host device 101. Operations S801 to S807 shown in FIG. 8 may be performed by the memory controller 110 included in the storage device 100.

In operation S801, the memory controller 110 may provide the host device 101 with block count information including bitmap information representing whether an erase number of each of a plurality of memory blocks is equal to or greater than a reference value. The block count information which the memory controller 110 provides to the host device 101 may be information which has a value of "1" with respect to a memory block having an erase number which is equal to or greater than the reference value among the plurality of memory blocks and has a value of "0" with respect to a memory block having an erase number which is less than the reference value among the plurality of memory blocks.

In operation S803, the memory controller 110 may perform an erase operation on a memory block in which data corresponding to a write command received from the host device 101 is to be stored before the memory controller 110 executes the write command. In an example, the nonvolatile memory controller 111 shown with reference to FIG. 2 may perform the erase operation on the memory block in which the data corresponding to the write command is to be stored. When two or more memory blocks in which the data corresponding to the write command is to be stored are provided, the nonvolatile memory device 111 may perform the erase operation on the two or more memory blocks.

In another embodiment, the memory controller 110 may not perform the erase operation on memory block in which the data corresponding to the write command received from the host device 101 is to be stored before the memory controller 110 executes the write command. When the memory controller 110 executes the write command received from the host device 101 on the memory block on which the erase operation is not performed, the memory controller 110 may not update the block count information.

Therefore, the memory controller 110 may perform operation S805 only when the memory controller 110 performs the erase operation on a memory block in which the data corresponding to the write command received from the host device 101 is to be stored before the memory controller 110 executes the write command.

In the operation S805, the memory controller 110 may store, in the nonvolatile memory device 120, the data corresponding to the write command received from the host device 101, and then update the block count information. In an example, the nonvolatile memory controller 111 shown with reference to FIG. 2 may store the data corresponding to the write command received from the host device 101 in a memory block of the nonvolatile memory device 120, and the block count manager 112 may update the block count information.

In an embodiment, before the memory controller 110 stores the data corresponding to the write command received from the host device 101 in the nonvolatile memory device 120, the memory controller 110 may update the erase number of the memory block in which the corresponding data is to be stored. That is, the memory controller 110 may update the erase number of the memory block before the memory controller 110 updates the block count information.

In another embodiment, after the memory controller 110 stores the data corresponding to the write command received from the host device 101 in the nonvolatile memory device 120, the memory controller 110 may update the erase number of the memory block in which the corresponding data is to be stored. That is, the memory controller 110 may update the erase number of the memory block while the block count manager 112 updates the block count information.

In operation S807, the memory controller 110 may provide the updated block count information to the host device 101. In an example, the block count manager 112 shown with reference to FIG. 2 may provide the updated block count information to the host device 101.

In an embodiment, as a result obtained by performing the erase operation on the memory block in which the data corresponding to the write command received from the host device 101 is to be stored, when an erase number of the corresponding memory block is equal to or greater than the reference value, partial information of the updated block count information may be changed. For example, as a result obtained by performing the erase operation on a first memory block in which the data corresponding to the write command received from the host device 101 is to be stored, when an erase number of the first memory block is changed from 79.999 k to 80 k as the reference value, information on the first memory block among the updated block count information may be changed from "0" to "1."

Figure 9:
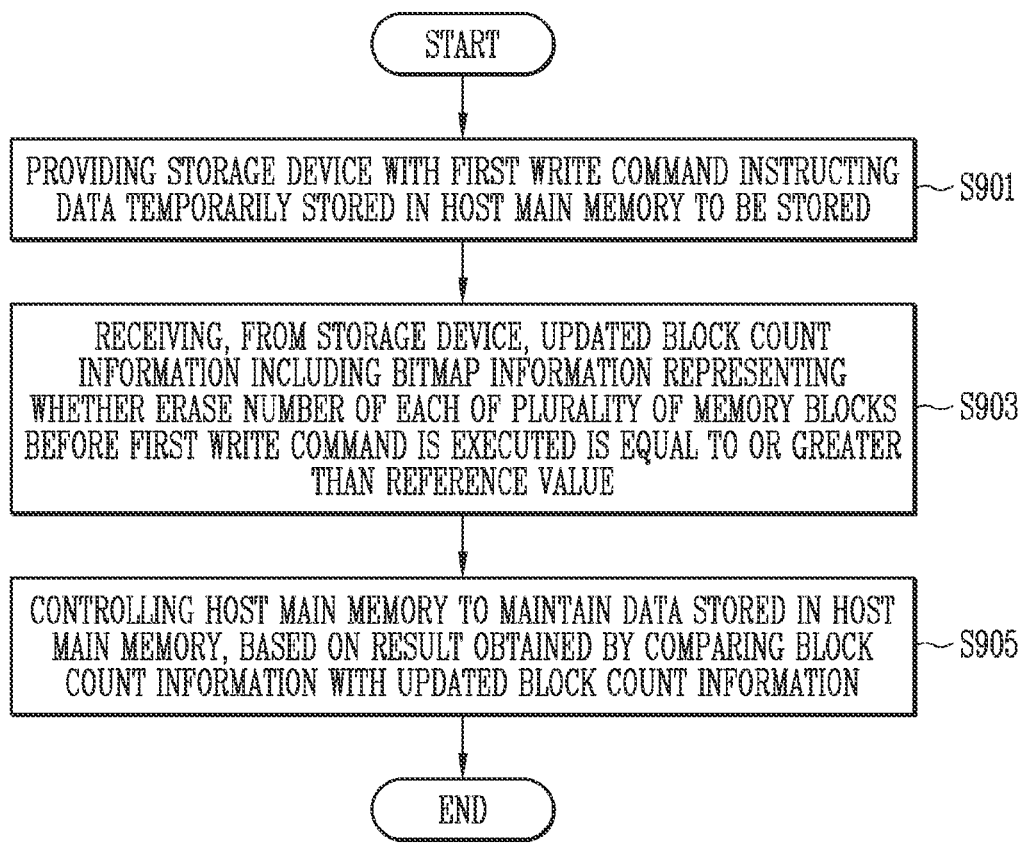
FIG. 9 is a flowchart for describing an operation of the host device in accordance with an embodiment of the present disclosure.

FIG. 9 is a flowchart for describing an operation of the host device 101 in accordance with an embodiment of the present disclosure.

Referring to FIG. 9, the host device 101 may determine whether to maintain data stored in the host device 101, based on a result obtained by comparing block count information stored in the host device with updated block count information received from the storage device 100. Operations S901 to 905 shown in FIG. 9 may be performed by the host processor 101-1 shown with reference to FIG. 2.

In operation S901, the host processor 101-1 may provide the storage device 100 with a first write command instructing data temporarily stored in the host main memory 101-2 shown with reference to FIG. 2 to be stored. In an example, the host processor 101-1 may provide the nonvolatile memory controller 111 with the first write command instructing first data temporarily stored in the host main memory 101-2 to be stored in the nonvolatile memory device 120 shown with reference to FIG. 2.

In operation S903, the host processor 101-1 may receive, from the storage device 100, updated block count information including bitmap information representing whether an erase number of each of a plurality of memory blocks before the first write command is executed is equal to or greater than a reference value. In an example, the host processor 101-1 may receive, from the block count manager 112, block count information including bitmap information representing whether an erase number of each of the plurality of memory blocks of the nonvolatile memory device 120 after the first write command is executed is equal to or greater than the reference value.

In operation S905, the host processor 101-1 may control the host main memory 101-2 to maintain the data stored in the host main memory 101-2, based on a result obtained by comparing the block count information stored in the host memory buffer 101-3 shown with reference to FIG. 2 with the updated block count information received from the storage device 100. In an example, the host processor 101-1 may determine whether to maintain the data stored in the host main memory 101-2 by comparing first block count information stored in the host memory buffer 101-3 with second block count information received from the block count manager 112. For example, when the first block count information stored in the host memory buffer 101-3 has a value of "0" as information on a first memory block of the nonvolatile memory device 120, and the second block count information which the host processor 101-1 receives from the block count manager 112 has a value of "1" as information on the first memory block of the nonvolatile memory device 120, the host processor 101-1 may control the host main memory 101-2 to maintain the data which is stored in the host main memory 101-2 and is associated with the first memory block. In another example, when the first block count information stored in the host memory buffer 101-3 has the value of "0" as information on a second memory block of the nonvolatile memory device 120, and the second block count information which the host processor 101-1 receives from the block count manager 112 has the value of "0" as information on the second memory block, the host processor 101-1 may control the host main memory 101-2 to maintain the data associated with the second memory block.

Figure 10:
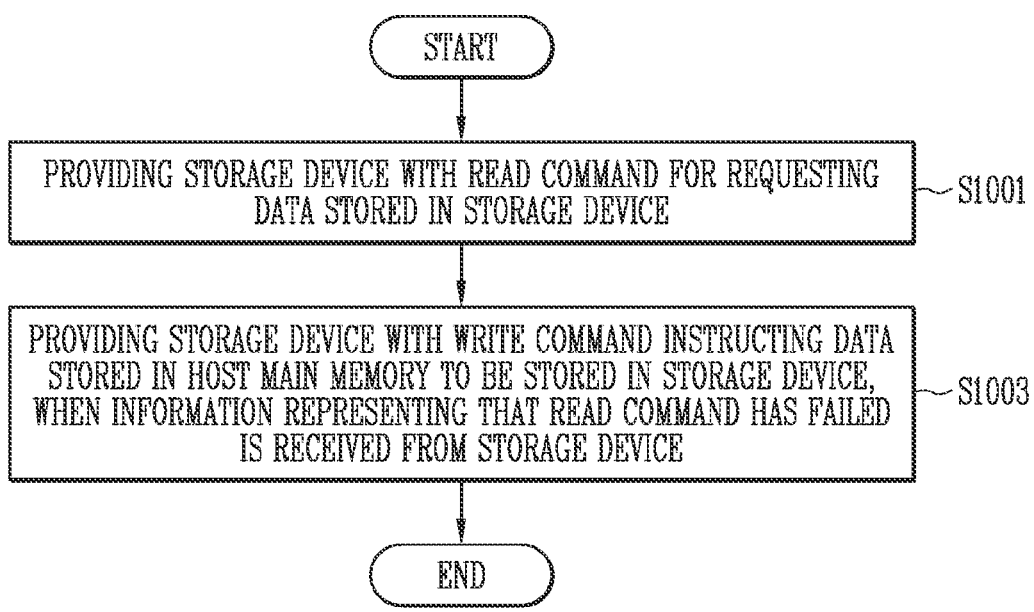
FIG. 10 is a flowchart for describing an operation of the host device in accordance with an embodiment of the present disclosure.

FIG. 10 is a flowchart for describing an operation of the host device 101 in accordance with an embodiment of the present disclosure.

Referring to FIG. 10, when the host device 101 receives, from the storage device 100, information representing that a read command has failed, the host device 101 may provide the storage device 100 with a write command instructing data stored in the host device 101 to be stored in the storage device 100. Operations S1001 and S1003 shown in FIG. 10 may be performed by the host processor 101-1 shown with reference to FIG. 2.

In operation S1001, the host processor 101-1 may provide the storage device 100 with a read command for requesting data stored in the storage device 100. In an example, the host processor 101-1 may provide the nonvolatile memory controller 111 shown with reference to FIG. 2 with the read command for requesting some of data stored in the nonvolatile memory device 120 shown with reference to FIG. 2 to be read.

In operation S1003, when the host processor 101-1 receives, from the storage device 100, information representing that the read command has failed, the host processor 101-1 may provide the storage device 100 with a write command instructing data stored in the host main memory 101-2 shown with reference to FIG. 2 to be stored in the storage device 100. In an example, when the host processor 101-1 receives, from the nonvolatile memory controller 111 shown with reference to FIG. 2, information representing that the read command provided to the storage device 100 has failed, the host processor 101-1 may provide the nonvolatile memory controller 111 with the write command instructing the data stored in the host main memory 101-2 to be stored in a first memory block of the nonvolatile memory device 120 shown with reference to FIG. 2.

Figure 11:
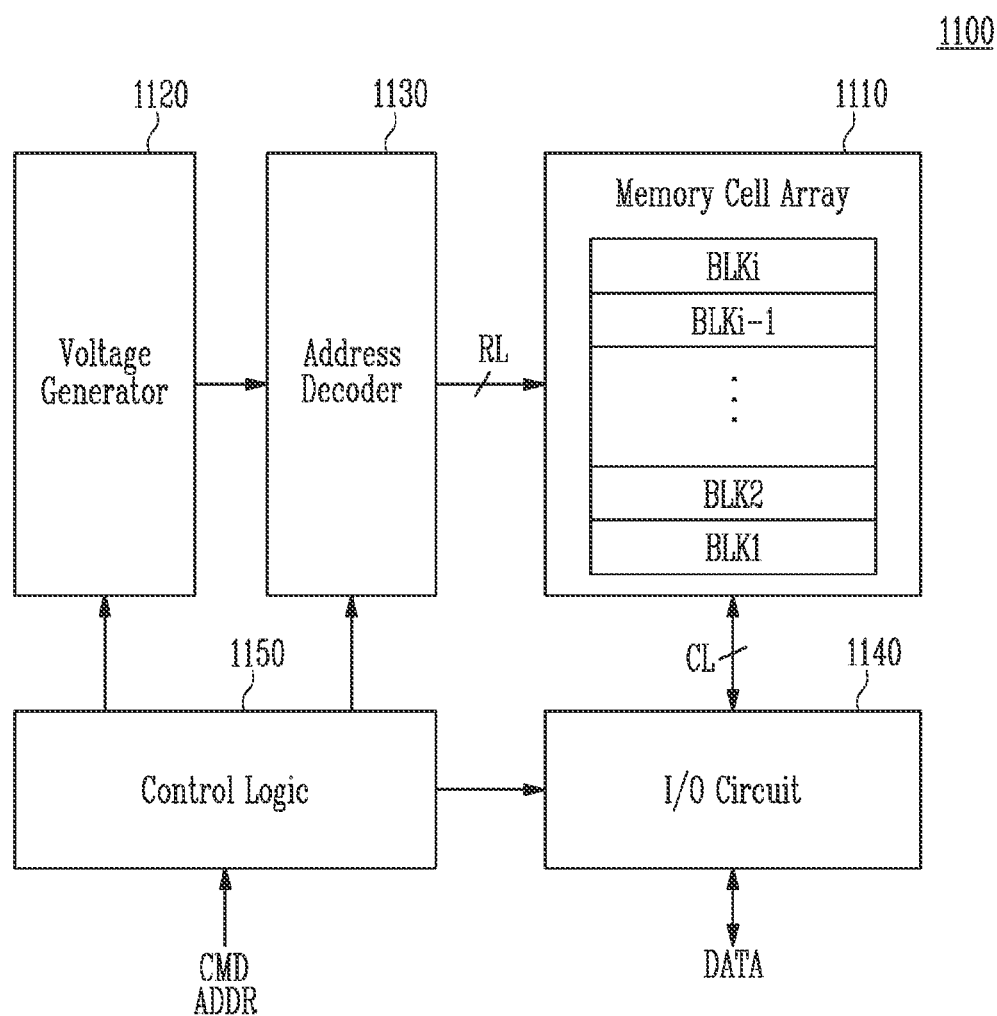
FIG. 11 is a diagram illustrating a memory device in accordance with an embodiment of the present disclosure.

FIG. 11 is a diagram illustrating a memory device 1100 in accordance with an embodiment of the present disclosure. The memory device 1100 shown in FIG. 11 is merely designated by another reference numeral for convenience of description, and may be understood as the same component as the nonvolatile memory device 120 shown in FIG. 2.

Referring to FIG. 11, the memory device 1100 may include a memory cell array 1110, a voltage generator 1120, an address decoder 1130, an input/output (I/O) circuit 1140, and a control logic 1150.

The memory cell array 1110 may include a plurality of memory blocks BLK1 to BLKi. The plurality of memory blocks BLK1 to BLKi may be connected to the address decoder 1130 through row lines RL. The plurality of memory blocks BLK1 to BLKi may be connected to the input/output circuit 1140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 1110 may include a plurality of physical pages. Each of the memory cells of the memory device 1100 may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

In an embodiment, the voltage generator 1120, the address decoder 1130, and the input/output circuit 1140 may be commonly designated as a peripheral circuit. The peripheral circuit may drive the memory cell array 1110 under the control of the control logic 1150. The peripheral circuit may drive the memory cell array 1110 to perform a program operation, a read operation, and an erase operation.

The voltage generator 1120 may generate a plurality of operating voltages by using an external power voltage supplied to the memory device 1100. The voltage generator 1120 may operate under the control of the control logic 1150.

In an embodiment, the voltage generator 1120 may generate an internal power voltage by regulating the external power voltage. The internal power voltage generated by the voltage generator 1120 may be used as an operating voltage of the memory device 1100.

In an embodiment, the voltage generator 1120 may generate a plurality of operating voltages by using the external power voltage or the internal power voltage. The voltage generator 1120 may generate various voltages required in the memory device 1100. For example, the voltage generator 1120 may generate a plurality of erase voltages, a plurality of program voltages, a plurality of pass voltages, a plurality of select read voltages, and a plurality of unselect read voltages.

In order to generate a plurality of operating voltages having various voltage levels, the voltage generator 1120 may include a plurality of pumping capacitors which receive the internal power voltage. The voltage generator 1120 may generate the plurality of operating voltages by selectively activating the plurality of pumping capacitors under the control of the control logic 1150.

The plurality of operating voltages generated by the voltage generator 1120 may be supplied to the memory cell array 1110 by the address decoder 1130.

The address decoder 1130 may be connected to the memory cell array 1110 through the row lines RL. The address decoder 1130 may operate under the control of the control logic 1150. The address decoder 1130 may receive an address ADDR from the control logic 1150. The address decoder 1130 may decode a block address in the received address ADDR. The address decoder 1130 may select at least one memory block among the memory blocks BLK1 to BLKi according to the decoded block address. The address decoder 1130 may decode a row address in the received address ADDR. The address decoder 1130 may select at least one word line among word lines of the selected memory block according to the decoded row address. In an embodiment, the address decoder 1130 may decode a column address in the received address ADDR. The address decoder 1130 may connect the input/output circuit 1140 and the memory cell array 1110 to each other according to the decoded column address.

The address decoder 1130 may include components such as a row decoder, a column decoder, and an address decoder.

The input/output circuit 1140 may include a plurality of page buffers. The plurality of page buffers may be connected to the memory cell array 1110 through the bit lines. In a program operation, data may be stored in selected memory cells according to data stored in the plurality of page buffers.

In a read operation, the data stored in the selected memory cells may be sensed through the bit lines, and the sensed data may be stored in the page buffers.

The control logic 1150 may control the address decoder 1130, the voltage generator 1120, and the input/output circuit 1140. The control logic 1150 may operate in response to a command CMD transferred from an external device. The control logic 1150 may control the peripheral circuit by generating control signals in response to the command CMD and the address ADDR.

Figure 12:
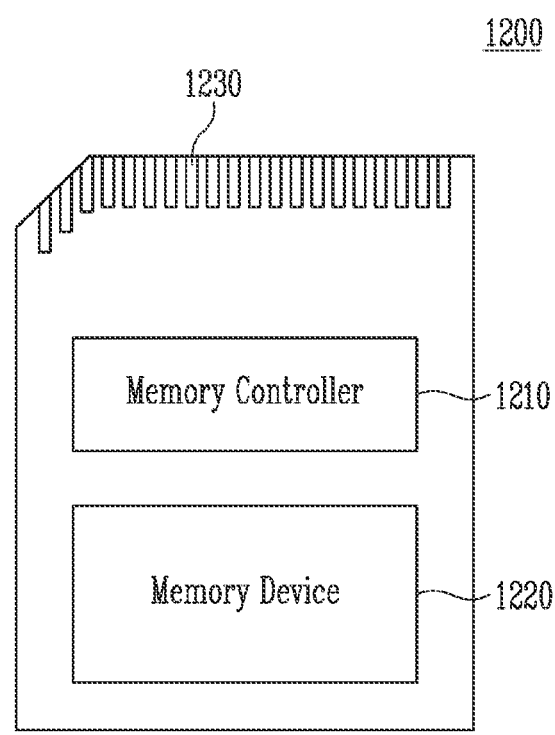
FIG. 12 is a block diagram illustrating a memory card system to which the storage device is applied in accordance with an embodiment of the present disclosure.

FIG. 12 is a block diagram illustrating a memory card system 1200 to which the storage device is applied in accordance with an embodiment of the present disclosure.

Referring to FIG. 12, the memory card system 1200 may include a memory controller 1210, a memory device 1220, and a connector 1230.

The memory controller 1210 is connected to the memory device 1220. The memory controller 1210 may access the memory device 1220. For example, the memory controller 1210 may control read, program, erase, and background operations of the memory device 1220. The memory controller 1210 provides an interface between the memory device 1220 and a host. The memory controller 1210 drives firmware for controlling the memory device 1220. The memory controller 1210 may be implemented identically to the memory controller 110 described with reference to FIG. 2.

The memory controller 1210 may include components such as a Random Access Memory (RAM), a processing unit, a host interface, a memory interface, and an ECC circuit.

The memory controller 1210 may communicate with an external device through the connector 1230. The memory controller 1210 may communicate with the external device (e.g., the host) according to a specific communication protocol. The memory controller 1210 may communicate with the external device through at least one of various communication standards or interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe. The connector 2300 may be defined by at least one of the above-described various communication standards or interfaces.

The memory device 1220 may be implemented with various nonvolatile memory devices such as an Electrically Erasable Programmable ROM (EEPROM), a NAND flash memory, a NOR flash memory, a Phase-change RAM (PRAM), a Resistive RAM (ReRAM), a Ferroelectric RAM (FRAM), and a Spin Transfer Torque magnetic RAM (STT-MRAM).

The memory controller 1210 and the memory device 1220 may be integrated into a single semiconductor device, to constitute a memory card. For example, the memory controller 1210 and the memory device 1220 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 13:
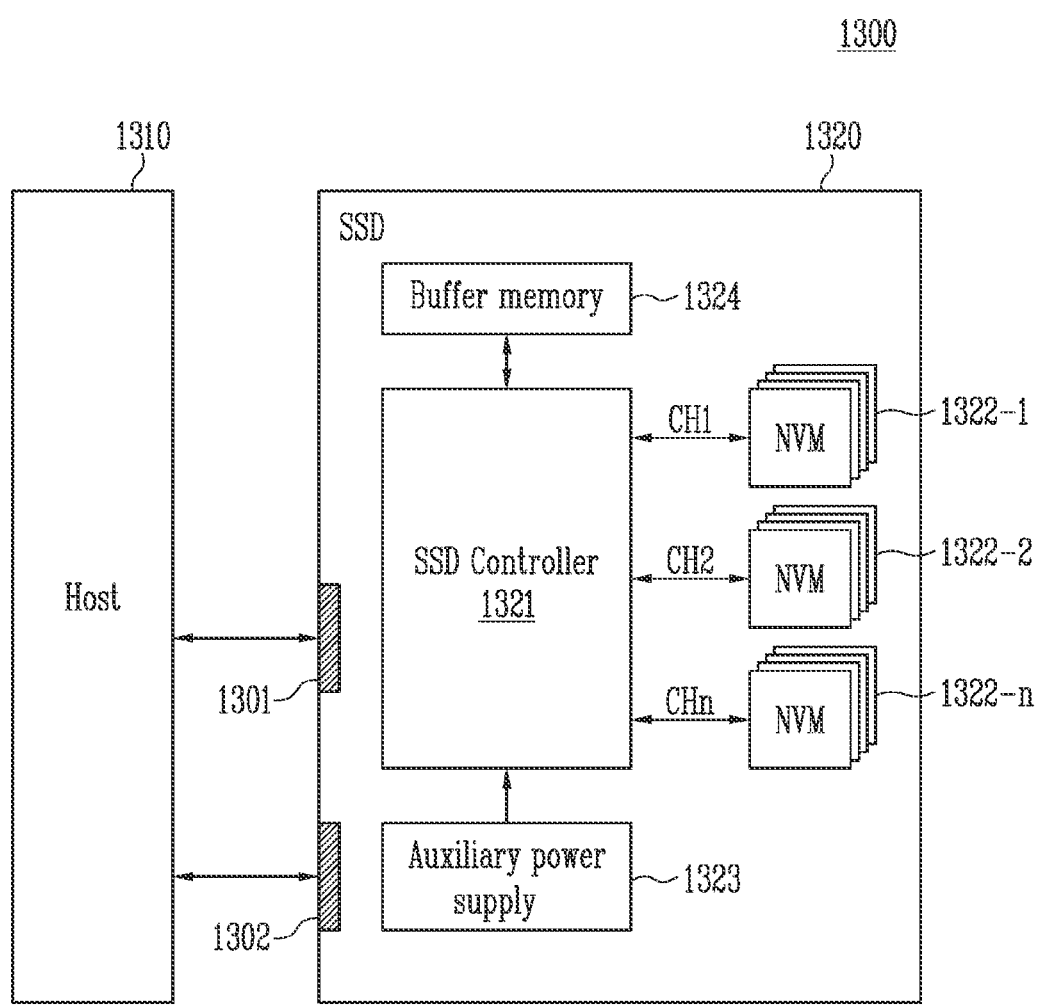
FIG. 13 is a block diagram illustrating a Solid State Drive (SSD) system to which the storage device is applied in accordance with an embodiment of the present disclosure.

FIG. 13 is a block diagram illustrating a Solid State Drive (SSD) system 1300 to which the storage device is applied in accordance with an embodiment of the present disclosure.

Referring to FIG. 13, the SSD system 1300 may include a host 1310 and an SSD 1320. The SSD 1320 may exchange signals with the host 1310 through a signal connector 1301, and receive power through a power connector 1302. The SSD 1320 may include an SSD controller 1321, a plurality of flash memories 1322-1 to 1322-n, an auxiliary power supply 1323, and a buffer memory 1324.

In accordance with an embodiment of the present disclosure, the SSD controller 1321 may serve as the memory controller 110 described with reference to FIG. 2.

The SSD controller 1321 may control the plurality of flash memories 1322-1 to 1322-n in response to a signal received from the host 1310. The signal may be a signal based on an interface between the host 1310 and the SSD 1320. For example, the signal may be a signal defined by at least one of communication standards or interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 1323 is connected to the host 1310 through the power connector 1302. The auxiliary power supply 1323 may receive the power PWR input from the host 1310, and charge with the power PWR. When the supply of power from the host 1310 is not smooth, the auxiliary power supply 1323 may provide power to the SSD 1320. The auxiliary power supply 1323 may be located in the SSD 1320, or be located at the outside of the SSD 1320. For example, the auxiliary power supply 1323 may be located on a main board, and provide auxiliary power to the SSD 1320.

The buffer memory 1324 may operate as a buffer memory of the SSD 1320. For example, the buffer memory 1324 may temporarily store data received from the host 1310 or data received from the plurality of flash memories 1322-1 to 1322-n, or temporarily store metadata (e.g., a mapping table) of the flash memories 1322-1 to 1322-n. The buffer memory 1324 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 14:
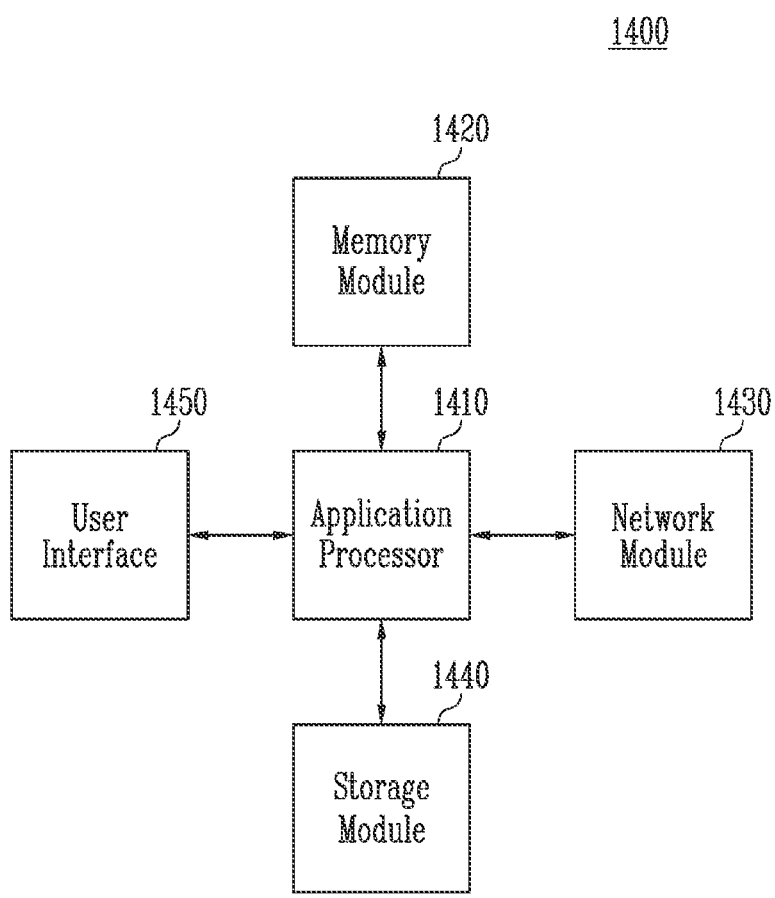
FIG. 14 is a block diagram illustrating a user system to which the storage device is applied in accordance with an embodiment of the present disclosure.

FIG. 14 is a block diagram illustrating a user system 1400 to which the storage device is applied in accordance with an embodiment of the present disclosure.

Referring to FIG. 14, the user system 1400 may include an application processor 1410, a memory module 1420, a network module 1430, a storage module 1440, and a user interface 1450.

The application processor 1410 may drive components included in the user system 1400, an operating system (OS), a user program, or the like. The application processor 1410 may include controllers for controlling components included in the user system 1400, interfaces, a graphic engine, and the like. The application processor 1410 may be provided as a System-on-Chip (SoC).

The memory module 1420 may operate as a main memory, working memory, buffer memory or cache memory of the user system 1400. The memory module 1420 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and an FRAM. The application processor 1410 and the memory module 1420 may be provided as one semiconductor package by being packaged based on a Package on Package (PoP).

The network module 1430 may communicate with external devices. The network module 1430 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), WiMAX, WLAN, UWB, Bluetooth, and Wi-Fi. The network module 1430 may be included in the application processor 1410.

The storage module 1440 may store data. For example, the storage module 1440 may store data received from the application processor 1410. Alternatively, the storage module 1440 may transmit data stored therein to the application processor 1410. The storage module 1440 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. The storage module 1440 may be provided as a removable drive such as a memory card of the user system 1400 or an external drive.

The storage module 1440 may include a plurality of nonvolatile memory devices, and the plurality of nonvolatile memory devices may operate identically to the nonvolatile memory device 120 described with reference to FIG. 2. The storage module 1440 may operate identically to the storage device 100 described with reference to FIG. 2.

The user interface 1450 may include interfaces for inputting data or commands to the application processor 1410 or outputting data to an external device. The user interface 1450 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 1450 may include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there is provided a storage device for efficiently utilizing a memory block by using bitmap information representing whether an erase number of the memory block is equal to or greater than a reference value, an electronic device including the storage device, and an operating method of the electronic device.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure and the following claims.

Moreover, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. Furthermore, the embodiments may be combined to form additional embodiments.

What is claimed is:

1. A storage device comprising:
    a nonvolatile memory device including a plurality of memory blocks; and
    a memory controller configured to:
    provide an external device with block count information including bitmap information representing whether an erase number of each of the plurality of memory blocks is equal to or greater than a reference value,
    perform an erase operation on a memory block in which data corresponding to a write command received from the external device is to be stored before the write command is executed,
    store the data in the nonvolatile memory device,
    update the block count information, and
    provide the updated block count information to the external device.

2. The storage device of claim 1, wherein the memory controller includes:
    a nonvolatile memory controller configured to control the nonvolatile memory device based on the write command; and
    a block count manager configured to update the block count information when an operation corresponding to the write command is completely performed.

3. The storage device of claim 2, wherein the block count information has a value of 1 with respect to a memory block having the erase number equal to or greater than the reference value and has a value of 0 with respect to a memory block having the erase number less than the reference value.

4. The storage device of claim 2, wherein the block count manager is further configured to provide the external device with the updated block count information simultaneously together with a response message as a result obtained by executing the write command.

5. The storage device of claim 2, wherein the block count manager is further configured to provide the external device with a response message as a result obtained by executing the write command and the updated block count information.

6. A host device for controlling a storage device, the host device comprising:
    a host main memory configured to temporarily store therein data to be stored in the storage device;
    a host memory buffer configured to store therein block count information as bitmap information representing whether an erase number of each of a plurality of memory blocks included in the storage device is equal to or greater than a reference value; and
    a host processor configured to:
    provide the storage device with a first write command instructing the storage device to store the data therein,
    receive, from the storage device, updated block count information including bitmap information representing whether the erase number of each of the plurality of memory blocks is equal to or greater than a reference value after the first write command is executed, and
    control the host main memory to maintain the data therein based on a result obtained by comparing the block count information with the updated block count information.

7. The host device of claim 6, wherein the host memory buffer is accessible by the storage device and the host processor.

8. The host device of claim 6, wherein the host main memory and the host memory buffer are integrated in one volatile memory device.

9. The host device of claim 6, wherein the host processor controls the host main memory to maintain the data therein when the erase number of a memory block in which the data is stored exceeds the reference value after the data is stored in the storage device.

10. The host device of claim 6, wherein the host processor is further configured to:
    provide the storage device with a read command for requesting the data stored in the storage device, and provide the storage device with a second write command instructing the storage device to store therein the data stored in the host main memory when the host processor receives, from the storage device, information representing that the read command has failed.

11. The host device of claim 6, wherein the host processor is further configured to control the host main memory to erase the data therefrom when the block count information and the updated block count information are the same as the result.

12. The host device of claim 6, wherein the host processor is configured to provide the storage device with the first write command together with a logical address of the data and the data.

13. The host device of claim 6, wherein the updated block count information has information different from at least partial information of the block count information.

14. A host device for controlling a storage device, the host device comprising:
a host memory buffer configured to store block count information therein including bitmap information representing whether an erase number of each of a plurality of memory blocks included in the storage device is equal to or greater than a reference value;
a host main memory configured to temporarily store data therein, the data being also stored in the storage device; and
a host processor configured to:
provide the storage device with a read command for requesting the data stored in the storage device, and
provide the storage device with a write command instructing the storage device to store therein the data stored in the host main memory when the host processor receives, from the storage device, information representing that the read command has failed.

15. The host device of claim 14, wherein the host memory buffer is accessible by the storage device and the host processor.

16. The host device of claim 14, wherein the host processor is further configured to erase the data from the host main memory after the providing of the write command.

17. The host device of claim 14, wherein the host main memory and the host memory buffer are integrated in one volatile memory device.

18. The host device of claim 14,
wherein the reference value is a first reference value, and
wherein the host processor receives, from the storage device, information representing the read command has failed when the erase number of a target memory block having the physical address corresponding to the logical address of the data to be read according to the read command is equal to or greater than a second reference value greater than the first reference value.

19. The host device of claim 14, wherein the host processor provides the storage device with the write command together with a logical address of the data and the data.

* * * * *

UNITED STATES PATENT AND TRADEMARK OFFICE
CERTIFICATE OF CORRECTION

PATENT NO. : 12,056,356 B2
APPLICATION NO. : 18/081585
DATED : August 6, 2024
INVENTOR(S) : Seung Kyu Hong It is certified that error appears in the above-identified patent and that said Letters Patent is hereby corrected as shown below:

In the Specification

In Column 4, Line 21, please change "USF" to --UFS"--

Signed and Sealed this
Twenty-fourth Day of September, 2024

Katherine Kelly Vidal
*Director of the United States Patent and Trademark Office*